(12) United States Patent
Chaitanya et al.

(10) Patent No.: US 7,930,448 B2
(45) Date of Patent: Apr. 19, 2011

(54) SYSTEM AND METHOD FOR STORAGE SUBSYSTEM PORT REASSIGNMENT IN STORAGE AREA NETWORKS

(75) Inventors: Shiva Chaitanya, State College, PA (US); Karan Gupta, San Jose, CA (US); Madhukar R. Korupolu, Sunnyvale, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/048,138

(22) Filed: Mar. 13, 2008

(65) Prior Publication Data

US 2009/0234984 A1 Sep. 17, 2009

(51) Int. Cl.
*G06F 3/00* (2006.01)
*G06F 5/00* (2006.01)
(52) U.S. Cl. ............ 710/38; 709/224; 709/226; 710/33; 710/36; 370/237
(58) Field of Classification Search ........................ None
See application file for complete search history.

(56) References Cited

U.S. PATENT DOCUMENTS

| | | | |
|---|---|---|---|
| 6,421,711 B1 | 7/2002 | Blumenau et al. | |
| 6,438,595 B1 * | 8/2002 | Blumenau et al. | 709/226 |
| 6,681,262 B1 | 1/2004 | Rimmer | |
| 6,957,433 B2 * | 10/2005 | Umberger et al. | 718/103 |
| 6,988,161 B2 * | 1/2006 | McConnell et al. | 710/316 |
| 7,093,011 B2 * | 8/2006 | Hirata et al. | 709/223 |
| 7,275,103 B1 * | 9/2007 | Thrasher et al. | 709/224 |
| 7,548,924 B2 * | 6/2009 | Watanabe | 707/100 |
| 2004/0025162 A1 * | 2/2004 | Fisk | 718/105 |
| 2004/0210656 A1 | 10/2004 | Beck et al. | |
| 2005/0271052 A1 | 12/2005 | Tang et al. | |
| 2006/0031508 A1 * | 2/2006 | Gellai et al. | 709/226 |
| 2007/0055797 A1 * | 3/2007 | Shimozono | 710/36 |
| 2007/0058619 A1 | 3/2007 | Gopal Gowda et al. | |
| 2008/0126615 A1 * | 5/2008 | Sinclair et al. | 710/38 |

OTHER PUBLICATIONS

Singh, Aameek et al., "Zodiac: Efficient Impact Analysis for Storage Area Networks," USENIX Association, FAST '05; 4th USENIX Conference on File and Storage Technologies, 2005, pp. 73-86.*
Pollack, K.T.; Uttamchandani, S.M.; , "Genesis: A Scalable Self-Evolving Performance Management Framework for Storage Systems," Distributed Computing Systems, 2006. ICDCS 2006. 26th IEEE International Conference on , vol., No., pp. 33- 33, 2006 URL: http://ieeexplore.ieee.org/stamp/stamp.jsp?tp=&arnumber=1648820&isnumber=34569.*
Foskett, Stephen; Lunt, Jonathan, "Measuring and Improving Storage Utilization", 2001, StorageNetworks, Inc., pp. 1-14.*
V. Sundaram, et al., Efficient Data Migration in Self-managing Storage Systems. Proc. 3rd International Conference on Autonomic Computing (ICAC), Jun. 2006, pp. 297-300.

* cited by examiner

*Primary Examiner* — Tariq Hafiz
*Assistant Examiner* — Dayton Lewis-Taylor
(74) *Attorney, Agent, or Firm* — Kenneth L. Sherman, Esq.; Michael Zarrabian, Esq.; Myers Andras Sherman & Zarrabian LLP

(57) ABSTRACT

A method and system for data traffic management in a storage area network subsystem connected to multiple hosts via plural ports through a connection network is provided. Traffic management involves, for each port, determining input/output (IO) traffic utilization load of the port based on workloads from one or more hosts assigned to that port; and detecting if a port is in utilization overload. Then, upon detecting a port utilization overload, port traffic is managed by adjusting traffic utilization of the overloaded port and one or more other ports in the storage subsystem, to reduce traffic utilization of the overloaded port.

25 Claims, 3 Drawing Sheets

SYSTEM AND METHOD FOR STORAGE SUBSYSTEM PORT REASSIGNMENT IN STORAGE AREA NETWORKS

BACKGROUND OF THE INVENTION

1. Field of the Invention

The present invention relates generally to storage area networks, and in particular to data traffic management in a storage area network (SAN).

2. Background Information

Storage environments for enterprises are becoming increasingly complex as storage demands increase, and further due to an increasing number of hardware devices and subsystems included in SANs to meet such growing storage demands. A SAN typically includes a collection of one or more storage subsystems (storage controllers) connected by switches and connection fabrics to host systems. Each such storage subsystem includes a collection of one or more input/output (IO) ports through which it is connected to the fabrics. For a host to access a storage volume residing on a storage subsystem, one or more ports on the storage subsystem are chosen and paired with ports on the host. Thereafter, all the IO traffic initiated by that host to that storage volume flows through the designated ports.

Multiple workloads can use a particular port on a storage subsystem. Such allocation may initially suffice, but over time workloads experience growth or changes in usage patterns. If one or more workloads incur spikes in usage or grow over time, then the port(s) they are assigned to can become overloaded. This leads to performance degradation, not just for the spiking workload, but for all the workloads that utilize that port.

In such scenarios, moving one or more volumes of a workload from a storage subsystem with an overloaded port to another storage subsystem in the SAN may help mitigate the overload situation. However, migrating data is a complex and costly operation, and the cost increases depending on the amount of data that needs to be migrated.

SUMMARY OF THE INVENTION

A method and system for data traffic management in a storage subsystem connected to multiple hosts via plural ports through a connection network is provided. In one embodiment, traffic management involves, for each port, determining input/output (IO) traffic utilization load of the port based on workloads from one or more hosts assigned to that port; and detecting if a port is in utilization overload. Then, upon detecting a port utilization overload, port traffic is managed by adjusting traffic utilization of the overloaded port and one or more other ports in the storage subsystem, to reduce traffic utilization of the overloaded port.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of storage area networks, as well as operation and/or component parts thereof. While the following description will be described in terms of a storage area network for clarity and to place the invention in context, it should be kept in mind that the teachings herein may have broad application to all types of traffic management in storage networks.

The invention provides a system and method for storage subsystem input/output (IO) traffic management. One embodiment involves input/output (IO) traffic management by adaptive or automatic IO traffic management between multiple hosts and a storage area network, involving port reassignment, without requiring data migrations or hardware additions. Port reassignment is achieved by expanding the port set for a workload ("port addition"), decreasing the port set for another workload ("port deletion") and replacing a port for a workload with another/new port ("port migration"). Such port reassignment takes into consideration the connectivity of a workload host to a new port since different ports can be connected to different fabrics and hence may not be reachable from all hosts.

Figure 1:
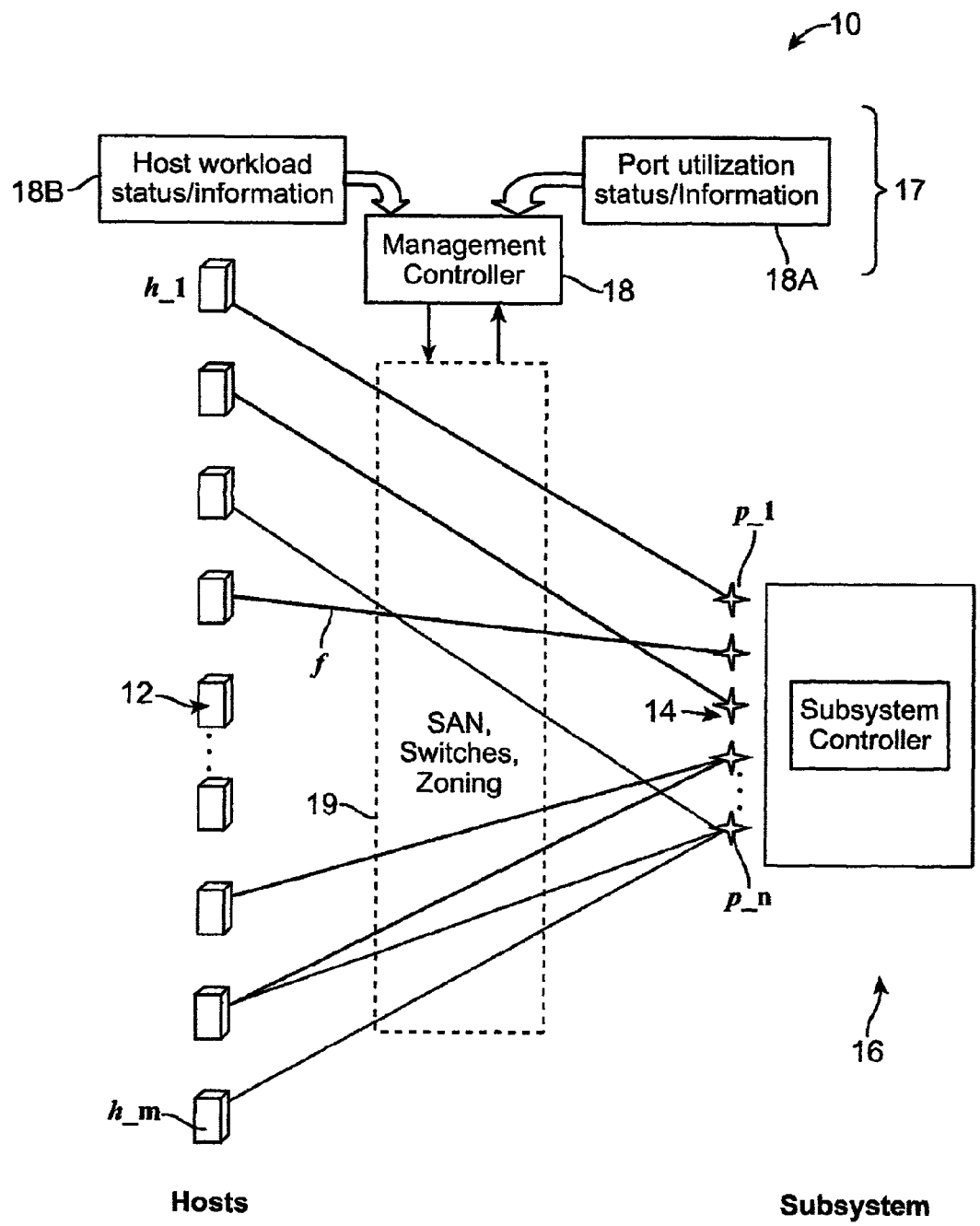
FIG. 1 shows a block diagram of a computing system including a collection of hosts connected to ports on a storage subsystem, implementing port reassignment, according to an embodiment of the invention.

FIG. 1 illustrates a system 10 implementing a port reassignment process according to the invention, wherein a collection of hosts 12 are connected to ports 14 on a storage subsystem 16 via fabrics f. The port reassignment is modeled as a bipartite graph: (H,P,E) wherein H represents a set of host nodes $\{h\_1, h\_2, \ldots, h\_m\}$, P represents a set of port nodes $\{p\_1, p\_2, \ldots, p\_n\}$ (one node for each port on the storage subsystem), and an E represents one or more edge e=(h, p) from a host node h to a port node p if h and p are connected by the same fabric f. Workloads from hosts access storage volumes in the storage subsystem via port nodes.

Each port is connected on one fabric f. To detect if a port reassignment is needed, the workload on the port nodes is determined. One or more workloads can use the same port. Similarly the same workload can use more than one port in which case the load of the workload is spread among the different ports typically in a round-robin fashion.

For example, port p_n may become overloaded, when the traffic through that port goes above a certain threshold T. Overload may occur when one or more of the workloads using that port spikes or grows in its storage usage.

A port traffic management apparatus 17 comprises a management controller 18, a port status monitor 18A and a host work load monitor 18B. The controller 18 implements a reassignment process which considers fabric connectivity between the hosts and the ports in a port assignment. If a port (e.g., p_1) is underloaded but the fabric to which it is connected is not available for a host (e.g., h_m), then that host cannot utilize that port.

Simply taking the highest workload on p_n and reassigning it to another port may not be feasible since the host h_m initiating that workload may not have other reachable ports with sufficient spare capacity for the workload. As such, the controller 18 computes a score for each host node h based on the amount of additional traffic that can be pushed from that host h to reachable ports, based on available connectivity between the host and the ports, and based on the spare capacity at the reachable ports without overloading said ports. As such, the port utilizations (traffic through each port) are maintained below the threshold T. In one example, the threshold T is the average utilization plus a certain margin, or the threshold T can be a hard coded number such as 80%, etc.

The controller 18 receives host workload status/information and also port utilization status/information, and uses the received information to determine port reassignment through a SAN, switches, zoning function 19. For each port p_i, the controller 18 computes a spare capacity SC(p_i, T) which represents the amount of traffic that can be pushed through the port p_i without port utilization exceeding the threshold T. For overloaded ports the utilization (used capacity) is high but spare capacity SC(.,T) is near zero. In one example, for overloaded ports, the corresponding SC(.) is set to zero.

For each host h_j, the set P_j denotes the set of ports p_i that are reachable from the host h_j (i.e., set of ports connected to the same fabrics as the host h_j). The controller 18 computes the spare port utilization capacity SC(h_j) available a host h_j to be the sum of SC(p_i, T) over all ports p_i in P_j.

The controller 18 uses SC(h_j) as an estimate of the amount of additional traffic that can be pushed from h_j to the set of ports P_j. SC(h_j) is smaller for hosts that have fewer port connections left and also smaller for hosts whose reachable ports are overloaded. Using the computed SC(.) values, the controller 18 manages IO traffic by performing port deletion, port migration and port addition, as necessary.

When there is a port with utilization above the threshold T (i.e., overloaded port), the controller 18 sorts a list of the ports in decreasing order of utilization, and also sorts a list of the hosts in decreasing order of SC(.). To reduce the overload, the controller 18 processes the port and host lists starting from the highest utilization port and highest SC(.) host, onward as described below.

Select Overloaded Port

A port p_i is selected as the highest utilized port on the port list, and also selects a host h_j with the highest SC(h_j) from the host list. The controller 18 then determines w(h_j, p_i) among all workloads as the contribution of workload w from host h_j to the utilization of the port p_i.

Port Deletion

If part of the SC(h_j) is due to ports that are already assigned to the workload from h_j, and the SC(.,T) values for said already assigned ports add up to more than w(h_j,p_i), then the controller 18 drops p_i for h_j and reassigns the workload w among said already assigned ports, otherwise the controller 18 performs port migration as follows.

Port Migration

The controller 18 checks a port p_k with the highest spare capacity contribution to SC(h_j) and determines if the SC(p_k, T) for the port p_k exceeds w(h_j,p_i). If yes, then the controller selects the workload contribution of h_j to port p_i, and migrates that selected workload contribution to the port p_k. Otherwise, if the SC(p_k, T) for the port p_k does not exceed w(h_j, p_i), then the controller performs port addition as follows.

Port Addition

The controller 18 selects a port p_k with the highest contribution to SC(h_j), and if the SC(p_k,T) value indicates that the port p_k can accommodate being an additional port for the workload of h_j (i.e., w(h_j,p_i)), then the controller 18 adds the port p_k as an additional port for the workload w(h_j, p_i). As a result, the workload w(h_j, p_i) prior to addition of a port is now shared among the previously assigned ports and the additional port. As such, w(h_j, p_i) is reduced, thereby reducing utilization overload on the port p_i.

Updating

The controller 18 updates the SC(., T) values for those ports involved in a migration, and the controller 18 further updates the SC(.) values for hosts connected to the ports involved in a migration.

If utilization of the port p_i remains above the threshold T, then the controller 18 processes the next host in said sorted list of hosts above whose workload contributes to the utilization of the port p_i, and repeats port deletion, port migration and port addition operations above as necessary.

If utilization of the port p_i has been reduced below the threshold T, the controller 18 processes the next port in said sorted list of ports above, and repeats the host selection, port deletion, port migration and port addition operations above as necessary.

Figure 2:
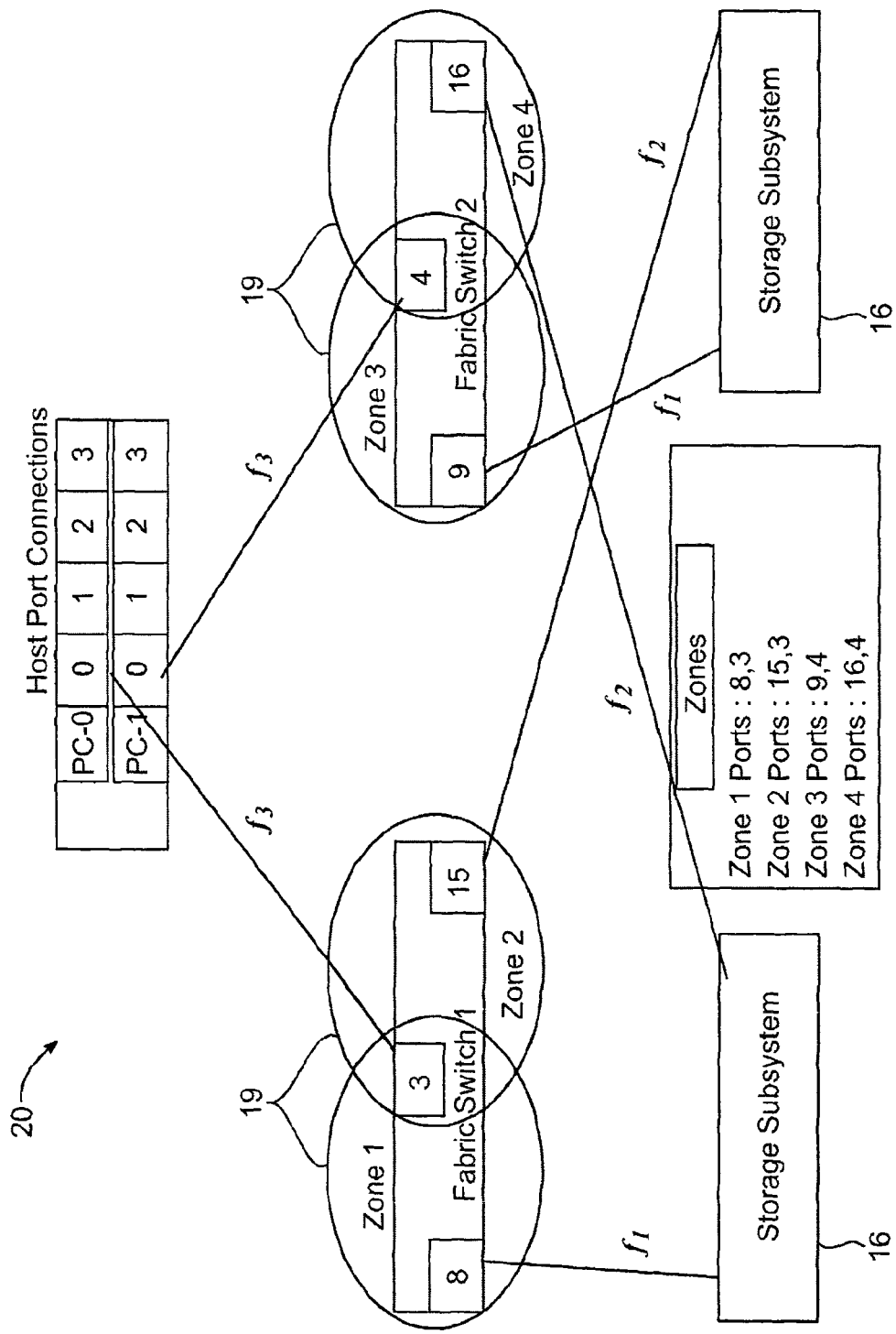
FIG. 2 shows a block diagram of example fiber zoning.

In FIG. 1, the connections between the hosts and the ports are through logical connections via a SAN, switches, zoning function 19. Based on commands from the controller 18 for port reassignments (i.e., port deletion, migration, addition, etc.) the SAN zoning switching function 19 performs known fabric zoning changes. FIG. 2 shows an example fabric zoning 20 of SAN ports to host ports via fabrics ($f_1, f_2, f_3$) which implements port reassignment according to the invention. Because port reassignment is less complex and involved than data migration, the port reassignment process obviates the need for unnecessary data migrations.

Figure 3:
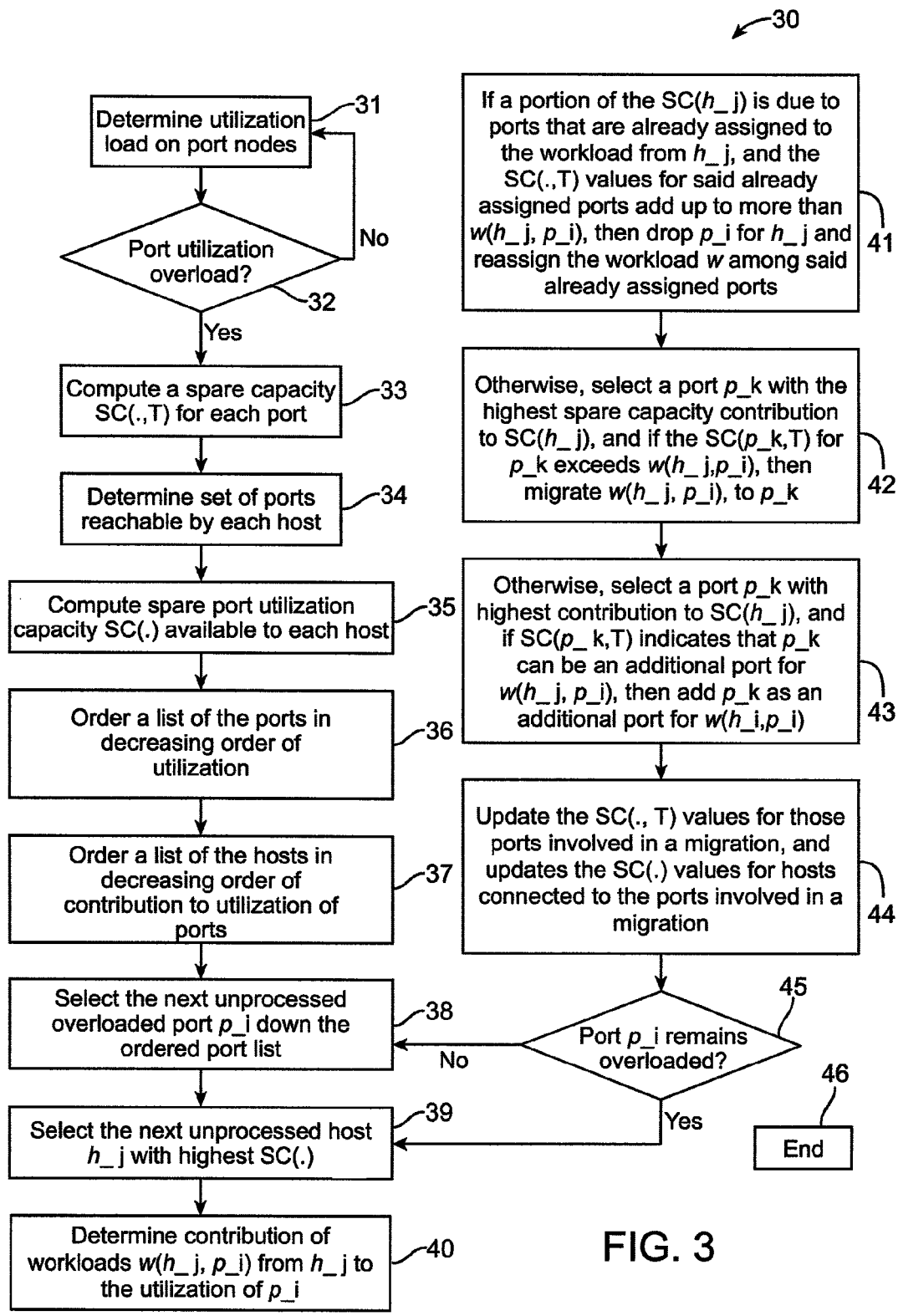
FIG. 3 shows a flowchart of a reassignment process, according to an embodiment of the invention.

FIG. 3 shows a flowchart of the steps of an example port reassignment process 30 according to the invention, including the steps of:

Step 31: Monitor port utilization and determine utilization load on port nodes.

Step 32: Determine if there is port utilization overload (i.e., any port utilization above the threshold T)? If yes, proceed to step 33, else go back to step 31.

Step 33: For each port compute a spare capacity score SC(p_i, T) which is the amount of traffic that can be pushed through port p_i without its utilization exceeding the threshold T (for overloaded ports SC(p_i, T) is set to 0).

Step 34: For each host h_j, determine P_j, the set of ports that are reachable from h_j.

Step 35: For each host h_j, compute the spare port utilization capacity SC(h_j) available to the host h_j as the sum over all ports p_i in P_j of SC(p_i, T).

Step 36: Order a list of the ports in decreasing order of utilization for processing in that order. The ports are ordered by their utilization such that the overloaded ones are considered first.

Step 37: Order a list of the hosts in decreasing order of contribution to utilization to p_i.

Step 38: Select the next unprocessed port p_i from the ordered port list (e.g., let p_i be the next highest loaded port on the port list).

Step 39: Select the port p_i as above and then among all the hosts contributing to p_i, select the next unprocessed host with highest SC(.) (i.e., let h_j be the next unprocessed host with highest SC(.) in the ordered host list).

Step 40: Determine contribution of workloads from h_j to the utilization of p_i. Specifically, for p_i as the highest utilized port, the controller 18 determines w(h_j, p_i) among all workloads as the contribution of workload w from host h_j to the utilization of the port p_i.

Step 41: If at least a potion of the SC(h_j) is due to ports that are already assigned to the workload from h_j, and the SC(., T) values for said already assigned ports add up to more than w(h_j, p_i), then drop (delete) p_i for h_j and reassign the workload w among said already assigned ports, and go to step 46; otherwise go to step 42.

Step 42: Select a port p_k with the highest spare capacity contribution to SC(h_j), and determine if the SC(p_k, T) for the port p_k exceeds w(h_j, p_i). If yes, then select w(h_j, p_i), the workload contribution of h_j to port p_i, and migrate w(h_j, p_i) to the port p_k, proceed to step 46; otherwise go to step 43.

Step 43: Select a port p_k with the highest contribution to SC(h_j), and if the SC(p_k,T) value indicates that the port p_k can accommodate being an additional port for the workload of h_j (i.e., w(h_j, p_i)), then add the port p_k as an additional port for the workload w(h_j, p_i).

Step 44: Update the SC(., T) values for those ports involved in a migration, and update the SC(.) values for hosts connected to the ports involved in a migration.

Step 45: If utilization of the port p_i remains above the threshold T, then proceed back to step 39 to process the next host in the ordered host list, else proceed back to step 38 to process the next port in the ordered ports list.

Step 46: End.

Those skilled in the art will appreciate that the example architectures and processes described above, according to the invention, can be implemented in many ways, such as program instructions for execution by a processor, as logic circuits, as an application specific integrated circuit, as firmware, as computer program product, as computer program product on a readable media, etc.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for traffic management in a storage area network subsystem connected to multiple hosts via plural ports through a connection network, comprising the steps of:
   for each port, determining input/output (IO) traffic utilization load of the port based on workloads from one or more hosts assigned to that port;
   determining a score for each host based on an amount of additional traffic that can be pushed from each host to reachable ports, based on available connectivity between each host and the reachable ports, and based on determined spare capacity at the reachable ports without overloading the reachable ports;
   detecting if a port is in utilization overload by determining if traffic utilization for the port is above a threshold; and
   upon detecting a port utilization overload, managing port traffic by adjusting traffic utilization of the overloaded port and one or more other ports in the storage subsystem by reassigning workload and ports based on the determined scores using port deletion to reduce traffic utilization of the overloaded port, wherein port deletion comprises decreasing a port set for a workload, otherwise use port migration to reduce traffic utilization of the overloaded port, wherein port migration comprises replacing a port for a workload with another port; and
   if port migration does not reduce traffic utilization of the overloaded port, performing port addition to reduce traffic utilization of the overloaded port, wherein port addition comprises expanding the port set for a workload.

2. The method of claim 1, wherein traffic is adaptively managed between multiple hosts and a storage area network with port reassignment without requiring data migrations.

3. The method of claim 2, wherein managing port traffic by port deletion includes:
   for a host with an overloaded port, reassigning the workload between said host and the overloaded port, among one or more other ports that are assigned to said host, without overloading said other assigned ports, wherein said other assigned ports are reachable by said host through the connection network.

4. The method of claim 2, wherein managing port traffic further includes the steps of:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T; and
   (b) reassigning the traffic between said host and the overloaded port, among one or more of said other assigned ports with spare traffic capacity, without overloading said other assigned ports.

5. The method of claim 4, wherein managing port traffic further includes the steps of:
   (c) determining if the overloaded port remains overloaded; and
   (d) if the overloaded port remains overloaded, then repeating steps (a) through (d).

6. The method of claim 2, wherein managing port traffic by port migration includes:
   for a host with an overloaded port, selecting a port reachable by said host through the connection network, the selected port having sufficient spare traffic capacity to accommodate said traffic between the overloaded port and said host, and migrating said traffic from the overloaded port to the selected port.

7. The method of claim 2, wherein managing port traffic further includes the steps of:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T; and
   (b) selecting a port among said assigned ports, with sufficient spare traffic capacity to accommodate said traffic between the overloaded port and said host, and migrating said traffic from the overloaded port to the selected port.

8. The method of claim 7, wherein managing port traffic further includes the steps of:
   (c) determining if the overloaded port remains overloaded; and
   (d) if the overloaded port remains overloaded, then repeating steps (a) through (d).

9. The method of claim 2, wherein managing port traffic by port addition includes:
   for a host with an overloaded port, selecting a port reachable by said host through the connection network, the selected port having sufficient spare traffic capacity to accommodate at least a portion of the traffic between the overloaded port and said host, assigning the selected port to the host, and migrating said portion of traffic from the overloaded port to the selected port, wherein the traffic from the host flows) through the overloaded port and the selected port.

10. The method of claim 2, wherein managing port traffic further includes the steps of:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T; and
   (b) selecting a port among said assigned ports, with sufficient spare traffic capacity to accommodate at least a portion of the traffic between the overloaded port and said host, assigning the selected port to the host, and migrating said portion of traffic from the overloaded port to the selected port.

11. The method of claim 10, wherein managing port traffic further includes the steps of:
   (c) determining if the overloaded port remains overloaded; and
   (d) if the overloaded port remains overloaded, then repeating steps (a) through (d).

12. The method of claim 1, wherein the storage subsystem comprises a storage area network.

13. An apparatus for traffic management in a storage subsystem connected to multiple hosts via plural ports through a connection network, comprising:
   a monitor configured for determining input/output (IO) traffic utilization load of the port based on workloads from one or more hosts assigned to that port;
   a controller configured for computing a score for each host based on an amount of additional traffic that can be pushed from each host to reachable ports, based on available connectivity between each host and the reachable ports, and based on determined spare capacity at the reachable ports without overloading the reachable ports, for detecting if a port is in utilization overload by determining if traffic utilization for the port is above a threshold, and upon detecting a port utilization overload, managing port traffic by adjusting traffic utilization of the overloaded port and one or more other ports in the storage subsystem by reassigning workload and ports based on the determined scores using port deletion to reduce traffic utilization of the overloaded port, wherein port deletion comprises decreasing a port set for a workload, otherwise use port migration to reduce traffic utilization of the overloaded port, wherein port migration comprises replacing a port for a workload with another port; and
   if port migration does not reduce traffic utilization of the overloaded port, performing port addition to reduce traffic utilization of the overloaded port, wherein port addition comprises expanding the port set for a workload.

14. The apparatus of claim 13, wherein traffic is adaptively managed between multiple hosts and a storage area network with port reassignment without requiring data migrations.

15. The apparatus of claim 14, wherein the controller is configured for port deletion by:
   for a host with an overloaded port, reassigning the workload between said host and the overloaded port, among one or more other ports that are assigned to said host, without overloading said other assigned ports, wherein said other assigned ports are reachable by said host through the connection network.

16. The apparatus of claim 14, wherein the controller is configured for managing port traffic by:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;
   (b) reassigning the traffic between said host and the overloaded port, among one or more of said other assigned ports with spare traffic capacity, without overloading said other assigned ports;
   (c) determining if the overloaded port remains overloaded; and
   (d) if the overloaded port remains overloaded, then repeating steps (a) through (d).

17. The apparatus of claim 14, wherein the controller is configured for port migration by:
   for a host with an overloaded port, selecting a port reachable by said host through the connection network, the selected port having sufficient spare traffic capacity to accommodate said traffic between the overloaded port and said host, and migrating said traffic from the overloaded port to the selected port.

18. The apparatus of claim 14, wherein the controller is configured for managing port traffic by:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;
   (b) selecting a port among said assigned ports, with sufficient spare traffic capacity to accommodate said traffic between the overloaded port and said host, and migrating said traffic from the overloaded port to the selected port, wherein the traffic from the host flows through the overloaded port and the selected port;
   (c) determining if the overloaded port remains overloaded; and
   (d) if the overloaded port remains overloaded, then repeating steps (a) through (d).

19. The apparatus of claim 14, wherein the controller is configured for port addition by:
   for a host with an overloaded port, selecting a port reachable by said host through the connection network, the selected port having sufficient spare traffic capacity to accommodate at least a portion of the traffic between the overloaded port and said host, assigning the selected port to the host, and migrating said portion of traffic from the overloaded port to the selected port, wherein the selected port is used in addition to the overloaded port to manage workload originally assigned to the overloaded port.

20. The apparatus of claim 14, wherein the controller is configured for managing port traffic by:
   (a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;
   (b) selecting a port among said assigned ports, with sufficient spare traffic capacity to accommodate at least a portion of the traffic between the overloaded port and said host, assigning the selected port to the host, and migrating said portion of traffic from the overloaded port to the selected port;

(c) determining if the overloaded port remains overloaded; and (d) if the overloaded port remains overloaded, then repeating steps (a) through (d).

21. The apparatus of claim 13, wherein the storage subsystem comprises a storage area network.

22. A computer system comprising:

a storage subsystem connected to multiple hosts via plural ports through a connection network;

a port management module for port traffic management, comprising:

a monitor configured for determining input/output (IO) traffic utilization load of the port based on workloads from one or more hosts assigned to that port;

a controller configured for computing a score for each host based on an amount of additional traffic that can be pushed from each host to reachable ports, based on available connectivity between each host and the reachable ports, and based on determined spare capacity at the reachable ports without overloading the reachable ports, for detecting if a port is in utilization overload by determining if traffic utilization for the port is above a threshold; and upon detecting a port utilization overload, managing port traffic by adjusting traffic utilization of the overloaded port and one or more other ports in the storage subsystem by reassigning workload and ports based on the determined scores using port deletion to reduce traffic utilization of the overloaded port, wherein port deletion comprises decreasing a port set for a workload, otherwise use port migration to reduce traffic utilization of the overloaded port, wherein port migration comprises replacing a port for a workload with another port; and if port migration does not reduce traffic utilization of the overloaded port, performing port addition to reduce traffic utilization of the overloaded port, wherein port addition comprises expanding the port set for a workload.

23. The system of claim 22, wherein the controller is configured for port deletion by:

(a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;

(b) reassigning the traffic between said host and the overloaded port, among one or more of said other assigned ports with spare traffic capacity, without overloading said other assigned ports;

(c) determining if the overloaded port remains overloaded; and (d) if the overloaded port remains overloaded, then repeating steps (a) through (d).

24. The system of claim 22, wherein the controller is configured for port migration by:

(a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;

(b) selecting a port among said assigned ports, with sufficient spare traffic capacity to accommodate said traffic between the overloaded port and said host, and migrating said traffic from the overloaded port to the selected port;

(c) determining if the overloaded port remains overloaded; and (d) if the overloaded port remains overloaded, then repeating steps (a) through (d).

25. The system of claim 22, wherein the controller is configured for port addition by:

(a) determining spare traffic capacity of other ports assigned to a host that is assigned to the overloaded port, wherein the spare capacity of a port, SC (port, T), is computed as the amount of traffic that can be pushed through that port without the port utilization exceeding a threshold T;

(b) selecting a port among said assigned ports, with sufficient spare traffic capacity to accommodate at least a portion of the traffic between the overloaded port and said host, assigning the selected port to the host, and migrating said portion of traffic from the overloaded port to the selected port, wherein the traffic from the host flows through the overloaded port and the selected port;

(c) determining if the overloaded port remains overloaded; and (d) if the overloaded port remains overloaded, then repeating steps (a) through (d).

* * * * *